US008675113B2

(12) United States Patent
Rydenhag et al.

(10) Patent No.: US 8,675,113 B2
(45) Date of Patent: *Mar. 18, 2014

(54) USER INTERFACE FOR A DIGITAL CAMERA

(75) Inventors: Daniel Tobias Rydenhag, Gothenburg (SE); Per Erik Anders Jorisch, Malmö (SE); Jonas Ove Arbsjö, Malmö (SE)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,040

(22) Filed: Feb. 24, 2012

(65) Prior Publication Data

US 2013/0222663 A1  Aug. 29, 2013

(51) Int. Cl.
*H04N 5/222* (2006.01)
*H04N 5/262* (2006.01)

(52) U.S. Cl.
USPC .................. 348/333.11; 348/333.05; 348/239

(58) Field of Classification Search
USPC ................................ 348/239, 333.05, 333.11
See application file for complete search history.

(56) References Cited

U.S. PATENT DOCUMENTS

| 6,636,234 | B2 | 10/2003 | Endo et al. |
| 7,369,691 | B2 | 5/2008 | Kondo et al. |
| 2002/0171666 | A1 | 11/2002 | Endo et al. |
| 2003/0206179 | A1 | 11/2003 | Deering |
| 2004/0249270 | A1 | 12/2004 | Kondo et al. |
| 2008/0122796 | A1 | 5/2008 | Jobs et al. |
| 2008/0174570 | A1* | 7/2008 | Jobs et al. ..................... 345/173 |
| 2009/0256857 | A1* | 10/2009 | Davidson et al. ............. 345/619 |
| 2010/0026873 | A1* | 2/2010 | Lee ........................... 348/333.05 |
| 2011/0119619 | A1 | 5/2011 | Fong et al. |
| 2011/0185317 | A1* | 7/2011 | Thimbleby et al. ........... 715/863 |
| 2011/0249073 | A1 | 10/2011 | Cranfill et al. |
| 2012/0307126 | A1* | 12/2012 | Bhogal ..................... 348/333.11 |

FOREIGN PATENT DOCUMENTS

| KR | 10-2012-0007403 | | 1/2012 |
| KR | 1020120007403 | * | 1/2012 |

OTHER PUBLICATIONS

European Search Report issued in European Application No. 12156992.5-2202 on May 16, 2012.
Wen Muenyi, iOS 5 borrowed Windows Phone camera swipe-to-preview, IntoMobile, http://www.intomobile.com/2011/06/13/ios-borrowed-windows-phone-camera-swipe-to-preview/, Jun. 13, 2011 (downloaded Feb. 17, 2012).
Office Action mailed May 9, 2013, in co-pending U.S. Appl. No. 13/541,365.
Office Action issued Jul. 3, 2013, in European Patent Application No. 12 156 992.5-1902.

* cited by examiner

*Primary Examiner* — Tuan Ho
*Assistant Examiner* — Shahbaz Nazrul
(74) *Attorney, Agent, or Firm* — Oblon, Spivak, McClelland, Maier & Neustadt, L.L.P.

(57) ABSTRACT

The present disclosure provides a user interface for a digital camera such as a digital camera built into a smartphone or other multipurpose portable electronic device. The user interface simultaneously displays an electronic viewfinder image and at least one other image such as a previously captured image. The previously captured image is located within the electronic viewfinder image. Designated input causes the previously captured image to be enlarged from an initial size to an enlarged size.

24 Claims, 5 Drawing Sheets

USER INTERFACE FOR A DIGITAL CAMERA

TECHNICAL FIELD

The present disclosure relates to user interfaces, and more particularly to user interfaces for digital cameras.

BACKGROUND

Digital cameras, including digital cameras built into smartphones and other multipurpose portable electronic devices, are sometimes provided with an electronic viewfinder in which a real-time or "live" image being captured by a digital image sensor is displayed on a built-in display.

BRIEF DESCRIPTION OF THE DRAWINGS

FIGS. 2A to 6 are screenshots of a user interface for a digital camera in accordance with example embodiments of the present disclosure.

DETAILED DESCRIPTION OF EXAMPLE EMBODIMENTS

Reference will now be made to the accompanying drawings which show example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practised without some of these details. In other instances, well-known methods, procedures, and components have not been described in detail to avoid obscuring the example embodiments described. The description is not to be considered as limited to the scope of the example embodiments described herein.

Any reference to direction or orientation stated herein is for convenience and is not intended to be limiting unless explicitly stated herein. Any directional references in relation to the graphical user interface (GUI) are relative to the screen orientation of the GUI rather than a fixed point or reference on the host electronic device. The term "user interface" is sometimes used herein to refer to the GUI for convenience.

The present disclosure relates to a user interface for a digital camera such as a digital camera built into a smartphone or other multipurpose portable electronic device. The user interface simultaneously displays an electronic viewfinder comprising a real-time image within an electronic viewfinder portion of the user interface and at least one other image such as a previously captured image (for example, the last image taken). The previously captured image is located within the electronic viewfinder portion. Designated input, such as a touch gesture, causes the previously captured image to be enlarged from an initial size to an enlarged size.

The solution presented by the present disclosure allows the digital camera to remain active and ready to capture the next image while allowing the user to preview or peek at a previously captured image at a relatively large size without switching over to a "replay" or "playback" mode in which a previously captured image is displayed on the full screen and the digital camera is inactive and unable to capture another image. This solution also presents the possibility for improved computational efficiencies by avoiding a separate playback mode and the delay and processing cycle caused by switching between the playback mode and the camera mode.

In accordance with one example embodiment, there is provided a method for displaying an electronic viewfinder and other image data on an electronic device, the method comprising: displaying a user interface on the display, the user interface including a real-time image captured by a digital image sensor and displayed within an electronic viewfinder portion of the user interface and at least one other image within the electronic viewfinder portion; and enlarging on the display the at least one other image from an initial size to an enlarged size in response to a designated input signal.

In accordance with another example embodiment, there is provided a graphical user interface, comprising: an electronic viewfinder portion configured to display a real-time image on a display of an electronic device, the real-time image provided by a digital image sensor; and a preview portion located within the electronic viewfinder portion displaying at least one other image, wherein the preview portion is enlargeable from an initial size to an enlarged size in response to a designated input signal.

In accordance with a further example embodiment, there is provided an electronic device, comprising: a processor; a display coupled to the processor; and a digital image sensor coupled to the processor; wherein the processor is configured for performing the method(s) set forth herein.

In accordance with yet a further embodiment of the present disclosure, there is provided a computer program product comprising a computer readable medium having stored thereon computer program instructions for implementing a method on an electronic device, the computer executable instructions comprising instructions for performing the method(s) set forth herein.

Figure 1:
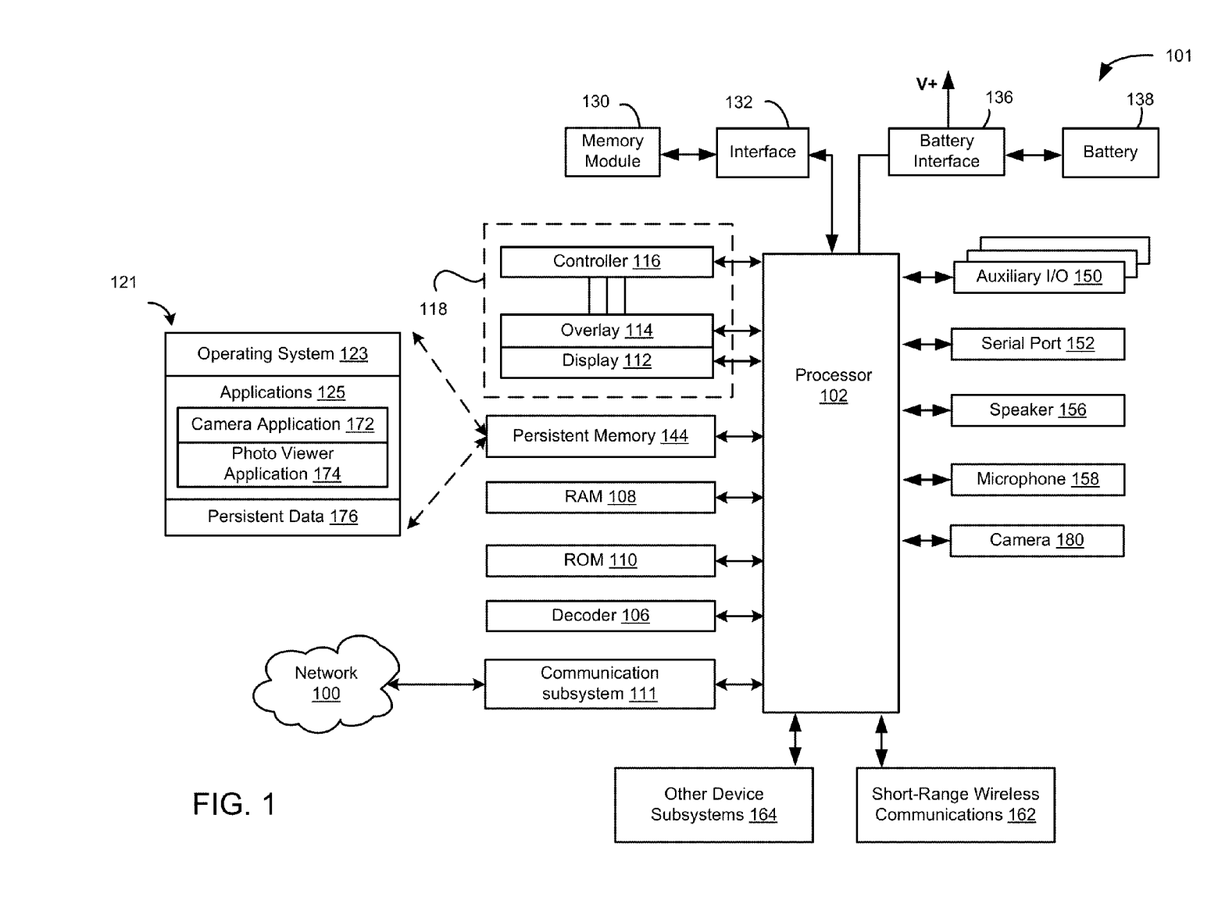
FIG. 1 is a block diagram illustrating a portable electronic device in accordance with one example embodiment of the present disclosure.

Reference is first made to FIG. 1 which illustrates a portable electronic device 101 (referred to hereinafter as merely electronic device 101 for convenience) in which example embodiments described in the present disclosure can be applied. The electronic device 101 described below has wireless communication capabilities, however, it is contemplated that the teachings of the present disclosure may be applied to devices without wireless communication capabilities. Examples of the electronic device 101 include, but are not limited to, a mobile phone, smartphone or superphone, tablet computer, notebook computer (also known as a laptop, netbook or ultrabook computer depending on the device capabilities), wireless organizer, personal digital assistant (PDA), electronic gaming device, and digital camera.

The electronic device 101 includes a rigid case (not shown) housing the electronic components of the device 101. The electronic components of the device 101 are constructed on a printed circuit board (not shown). The electronic device 101 includes a controller comprising at least one processor 102 (such as a microprocessor) which controls the overall operation of the device 101. Communication functions, including data and voice communications, are performed through a communication subsystem 111. Data received by the electronic device 101 may be decompressed and decrypted by a decoder 106. The communication subsystem 111 receives messages from and sends messages to a wireless network 100. The wireless network 100 may be any type of wireless network, including, but not limited to, data wireless networks, voice wireless networks, and networks that support both voice and data communications.

The processor 102 interacts with other components, such as Random Access Memory (RAM) 108, Read Only Memory (ROM) 110, a display 112 with a touch-sensitive overlay 114 operably connected to an electronic controller 116 that together comprise a touch-sensitive display 118, persistent (non-volatile) memory 144 such as flash memory, auxiliary input/output (I/O) subsystems 150, data port 152 such as serial data port (e.g., Universal Serial Bus (USB) data port), speaker 156, microphone 158, short-range communication subsystem 162, a digital camera 180, and other device subsystems generally designated as 164. The electronic device 101 may also include a keyboard and/or control buttons (not shown).

User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor, such as an accelerometer, to detect direction of gravitational forces or gravity-induced reaction forces so as to determine, for example, the orientation of the electronic device 101.

The processor 102 operates under stored program control and executes software modules 121 stored in memory such as persistent memory, for example, in the persistent memory 144. As illustrated in FIG. 1, the software modules 121 comprise operating system software 123 and software applications 125. The software applications include a camera application 172 and photo viewer application 174. The camera application 172 contains the logic for operating the digital camera 180 and capturing images and optionally video from the digital camera 180 and storing the images and video in the persistent memory 144. The photo viewer application 174 contains logic for displaying data (i.e., images and optionally video) from the persistent memory 144 and data from the digital camera 180 on the display 112 in a seamless and integrated fashion as described more fully below. Persistent data 176, including user data, is also stored in the persistent memory 144. The persistent data 176 includes any digital media files stored in the electronic device 101 such as still images and/or video clips (e.g., previously captured images and videos or previously stored or downloaded images and videos).

The software modules 121 or parts thereof may be temporarily loaded into volatile memory such as the RAM 146. The RAM 146 is used for storing runtime data variables and other types of data or information. Although specific functions are described for various types of memory, this is merely one example, and a different assignment of functions to types of memory could also be used.

In some embodiments, the electronic device 101 also includes a removable memory card 130 (typically comprising persistent memory such as flash memory) and a memory card interface 132. Network access is typically associated with a subscriber or user of the electronic device 101 via the memory card 130, which may be a Subscriber Identity Module (SIM) card for use in a GSM network or other type of memory card for use in the relevant wireless network type. The memory card 130 is inserted in or connected to the memory card interface 132 of the electronic device 101 in order to operate in conjunction with the wireless network 100.

The electronic device 101 also includes a battery 138 as a power source, which is typically one or more rechargeable batteries that may be charged, for example, through charging circuitry coupled to a battery interface such as the serial data port 152. The battery 138 provides electrical power to at least some of the electrical circuitry in the electronic device 101, and the battery interface 136 provides a mechanical and electrical connection for the battery 138. The battery interface 136 is coupled to a regulator (not shown) which provides power V+ to the circuitry of the electronic device 101.

A received signal, such as a text message, an e-mail message, or web page download, is processed by the communication subsystem 104 and input to the processor 102. The processor 102 processes the received signal for output to the display 112 and/or to the auxiliary I/O subsystem 150. A subscriber may generate data items, for example e-mail messages, which may be transmitted over the wireless network 100 through the communication subsystem 111, for example.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example embodiment, the touch-sensitive display 118 is a capacitive touch-sensitive display which includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 112 of the touch-sensitive display 118 includes a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch inputs, touch contacts or touch events, may be detected by the touch-sensitive display 118. Alternatively, the processor 102 may be configured to detect one or more touch gestures in accordance with touch data provided by the touch-sensitive overlay 114. The processor 102 may determine attributes of the touch, including a location of a touch. Touch location data may include an area of contact or a single point of contact, such as a point at or near a center of the area of contact known as the centroid. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The location of the touch moves as the detected object moves during a touch. The controller 116 and/or the processor 102 may detect a touch by any suitable contact member on the touch-sensitive display 118. Similarly, multiple simultaneous touches, are detected.

Different types of touch events are detected by the touch-sensitive display 118. A touch and hold event is detected or recognized when a touch event occurs for a duration which is greater than or equal to a threshold duration. The threshold duration may be, for example, 400 milliseconds in some embodiments. Other threshold durations are possible. A tap event is detected or recognized when at least one touch event occurs for a duration which is less than the threshold duration.

A one-finger touch and hold event occurs when a user touches a selectable onscreen item on the touch-sensitive display 118, such as a button or menu item, with one finger and holds the finger in contact with the touch-sensitive display 118 for a duration which exceeds the threshold duration. A two-finger touch and hold event occurs when a user touches a selectable onscreen item on the touch-sensitive display 118 with two-fingers and holds both fingers in contact with the touch-sensitive display 118 for a duration which exceeds the threshold duration. Touching a selectable onscreen item comprises touching a location of the touch-sensitive display 118 which is coincident with the selectable onscreen item displayed on the display 112. A location is coincident with the selectable onscreen item in that the centroid of the touch event is within an input area of the user interface screen assigned for receiving input for activating the selectable onscreen item. The input area of the selectable onscreen item may be different than the displayed area of the selectable onscreen item on the display screen 112 in some embodiments, typically the input area being larger than the displayed area in such embodiments to accommodate touch offset of the user.

The term "touch gesture" is used herein to refer to a particular type of touch event on a touch-sensitive display 118 that begins at an origin point and continues to an end point. A touch gesture may be identified by attributes of the touch gesture, including the origin point, the end point, the distance travelled, the duration, the velocity, and the direction, for example. A touch gesture may be long or short in distance and/or duration. Two points of the touch gesture may be utilized to determine a direction of the touch gesture.

A drag and hold gesture occurs when contact is maintained within the touch-sensitive display 118 and the touch point (e.g., centroid of the touch event) moves more than a threshold distance (typically measured in pixels). The drag and hold gesture ends when contact with the touch-sensitive display 118 ends.

A swipe (also known as a flick) is one type of touch gesture. A swipe has a single direction. The touch-sensitive overlay 114 may evaluate swipes with respect to the origin point at which contact is initially made with the touch-sensitive overlay 114 and the end point at which contact with the touch-sensitive overlay 114 ends rather than using each of location or point of contact over the duration of the touch gesture to resolve a direction. Examples of swipes include a horizontal swipe, a vertical swipe, and a diagonal swipe. A horizontal swipe typically comprises an origin point towards the left or right side of the touch-sensitive overlay 114 to initialize the touch gesture, a horizontal movement of the detected object from the origin point to an end point towards the right or left side of the touch-sensitive overlay 114 while maintaining continuous contact with the touch-sensitive overlay 114, and a breaking of contact with the touch-sensitive overlay 114. Similarly, a vertical swipe typically comprises an origin point towards the top or bottom of the touch-sensitive overlay 114 to initialize the touch gesture, a vertical movement of the detected object from the origin point to an end point towards the bottom or top of the touch-sensitive overlay 114 while maintaining continuous contact with the touch-sensitive overlay 114, and a breaking of contact with the touch-sensitive overlay 114.

Swipes can be of various lengths, can be initiated in various places on the touch-sensitive overlay 114, and need not span the full dimension of the touch-sensitive overlay 114. In addition, breaking contact of a swipe can be gradual in that contact with the touch-sensitive overlay 114 is gradually reduced while the swipe is still underway.

Meta-navigation touch gestures may also be detected by the touch-sensitive display 118. A meta-navigation touch gesture is a touch gesture that has an origin point that is outside the display area of the touch-sensitive display 118 and that moves to a position on the display area of the touch-sensitive display 118. Other attributes of the touch gesture may be detected and be utilized to detect the meta-navigation touch gesture. Meta-navigation touch gestures may also include multi-touch touch gestures in which touch gestures are simultaneous or overlap in time and at least one of the touches has an origin point that is outside the display area and moves to a position on the display area of the touch-sensitive display 118. Thus, two fingers may be utilized for meta-navigation touch gestures. Further, multi-touch meta-navigation touch gestures may be distinguished from single touch meta-navigation touch gestures and may provide additional or further functionality.

The touch-sensitive display 118 is described herein in the context of fingers of a device user for purposes of convenience only. As mentioned previously, a stylus or other object may be used for interacting with the touch-sensitive display 118 depending on the type.

Figure 2A:
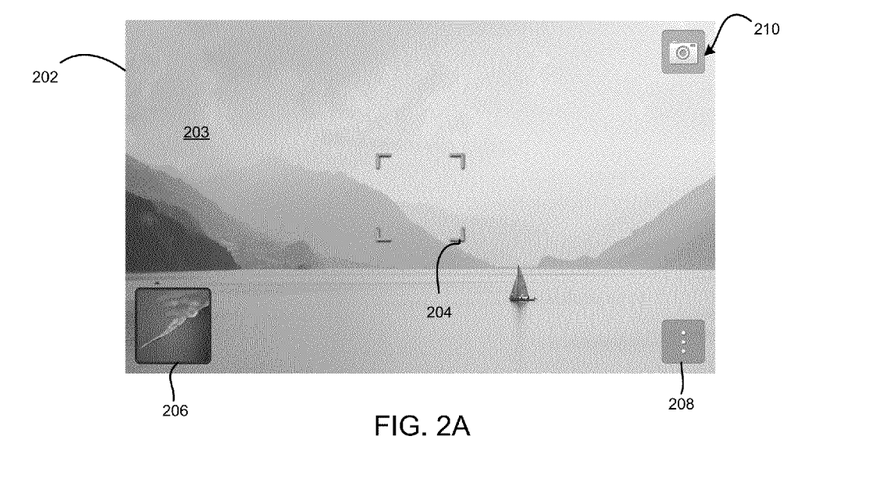

FIGS. 2A to 6 are screenshots of a user interface (UI) for the digital camera 180. FIG. 2A shows a UI screen having an electronic viewfinder portion 202 for the digital camera which displays a real-time or "live" image 203 (or an approximation of an image) being captured with the digital camera 180, for example, by a digital image sensor (not shown) of the digital camera 180. In the shown embodiment, the electronic viewfinder portion 202 occupies all or substantially all of the viewable area of the display 112. In other embodiments, the electronic viewfinder portion 202 could occupy a lesser portion of the display 112.

The UI screen also includes a reticule 204 located in the centre of the real-time image 203 in the shown embodiment. The reticule 204 may be omitted in other embodiments. The reticule 204 identifies the centre of the real-time image and possibly the location of an autofocus point of the digital camera 180. The UI screen also includes a menu button 208 for causing a menu for the digital camera 180 to be displayed and a mode button 210 which indicates whether the digital camera 180 is in a still image mode or video camera mode and causing toggling or switching between the still image mode and video camera mode.

Interacting with the menu button 208 causes the menu UI screen to be displayed in the display 112 for interaction therewith. Interacting with the mode button 210 toggles the electronic device 101 between the still image mode and video camera mode. Interacting with the menu button 208 and mode button 210 may comprise corresponding touch inputs or events. Interacting also causes the appearance of the mode button 210 to change depending on whether the electronic device 101 is in the still image mode and/or video camera mode. In the shown embodiment, when the electronic device 101 is in the still image mode, the mode button 210 includes an icon or other pictorial representation of a still camera icon as shown in FIG. 2A. When the electronic device 101 is in the video camera mode, the mode button 210 includes an icon or other pictorial representation of a video camera. Other UI schemes to represent the current mode are possible and may be used in other embodiments.

Figure 2B:
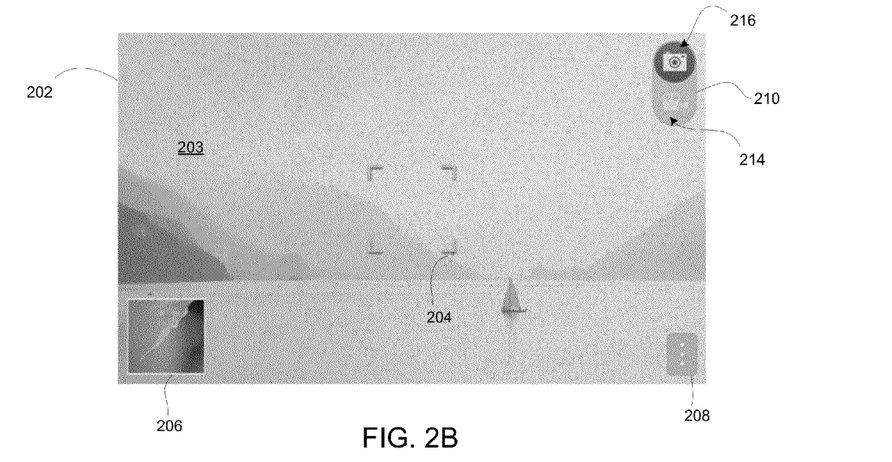

FIG. 2B illustrates another embodiment in which the mode button 210 includes a still camera icon 216 and video camera icon 214. Interacting with the mode button 210 causes a corresponding one of the still camera icon 216 and video camera icon 214 to be changed to an active state, and the other of the still camera icon 216 and video camera icon 214 to be changed to an inactive state depending on whether the electronic device 101 is in the still image mode and/or video camera mode. In the shown embodiment, the electronic device 101 is in the still image mode and the still camera icon 216 is in the active state. The active state of the still camera icon 216 and video camera icon 214 may be less transparent and/or a different colour than the inactive state, among other possible UI schemes.

The real-time image 203 displayed in the electronic viewfinder portion 202 can be "taken", i.e. stored in the persistent memory 144, in response to the electronic device 101 receiving designated input. The capture image is typically stored with metadata describing the image, such as the date and time the image was captured. When an image is taken with the digital camera 180, the captured image or an approximation thereof may be displayed in the electronic viewfinder portion 202 for a set amount of time (e.g., 1 or 2 seconds, etc.) after which the captured image is no longer displayed and the real-time image 203 is again displayed in the electronic viewfinder portion 202. The captured image or an approximation thereof is then displayed in a preview portion 206 within the electronic viewfinder portion 202. In the shown embodiment, the preview portion 206 is located towards a bottom left of the electronic viewfinder portion 202. In other embodiments, the preview portion 206 could be located elsewhere within the electronic viewfinder portion 202.

When no previously captured image exists, the preview portion 206 may be represented as an empty box of the same size as an initial size of the preview portion 206, or a default image such as a previously stored (e.g., pre-stored) or downloaded image may be displayed within the preview portion 206. Alternatively, when no previously captured image exists the preview portion 206 may be omitted.

The captured image may be stored remotely in addition to, or instead of, the persistent memory 144. Remote storage of captured images and optionally videos may be implemented, at least in part, as a cloud based solution in which a plurality of electronic devices 101 share resources, e.g. content servers (not shown). The user accesses captured images through a thin client on the electronic device 101. The majority of the processing logic and data is stored on the shared resources (e.g., servers) at a remote location. Cloud computing may allow access from nearly any electronic device 101 having access to the Internet or other connecting communications network.

Designated enlargement input, detected by the electronic device 101, can cause the image displayed in the preview portion 206 to be enlarged from an initial size, such as a default display size, to an enlarged size larger than the initial size. The image displayed in the preview portion 206 is typically a thumbnail (e.g., reduced size/resolution version) of the captured image for graphical processing efficiency. The thumbnail may change from a lower-sized image in the initial size to a relative higher-sized image (relative to the initial size) in the enlarged size in response to the designated enlargement input.

In at least some embodiments, the initial size and aspect ratio of the preview portion 206 and the image displayed in the preview portion 206 may be fixed regardless of the aspect ratio of the captured image which is displayed within the preview portion 206. For example, the aspect ratio of the preview portion 206 and the image displayed in the preview portion 206 may be fixed at 1:1. When the aspect ratio of the source image is different than the fixed aspect ratio of the preview portion 206, the image displayed within the preview portion 206 is typically cropped so that the displayed image matches the fixed aspect ratio. Cropping is less intensive in terms of graphics processing than resizing the source image and avoids distortion of the source image, which would negate some of the benefits of the preview portion 206.

When the designated enlargement input is detected, the aspect ratio of the preview portion 206 and the image displayed in the preview portion 206 may be changed to match that of the source image if it is different than the fixed aspect ratio of the preview portion 206 (which could be, for example, 4:3 or 16:9 among other possibilities). This allows the user to see the full source image which was previously cropped, and allows the preview portion 206 to be of fixed size and aspect ratio regardless of the aspect ratio of the source image, creating efficiencies in terms of graphics processing and user adoption.

In the described embodiments the designated enlargement input is a touch gesture, however, a tap or other touch event or other designated enlargement input could be used in other embodiments. The designated touch gesture, in at least some embodiments, is a drag and hold gesture having a start point in or near the preview portion 206. It is contemplated that the designated touch gesture can be performed on a portion of the real-time image 203 if within a threshold distance of the preview portion 206. In some embodiments, the touch gesture may be more specific in terms of the location of the start point, end point, direction of movement (directionality of the touch gesture), distance of travel of the gesture, or a combination thereof.

In one example embodiment, the designated touch gesture is a drag and hold gesture having a start point in or near the preview portion 206, a travel distance which extends at or beyond a threshold distance, and an end point in the real-time image 203 of the electronic viewfinder portion 202. In other embodiments, only one of the travel distance and end point are specified parameters. In embodiments in which the preview portion 206 is located towards a bottom left of the electronic viewfinder portion 202 as in the shown embodiment, the designated touch gesture may be a touch gesture having a start point located in the upper right quadrant of the preview portion 206 and a direction of movement away from the preview portion 206 (e.g., towards the centre of the electronic viewfinder portion 202). A threshold distance of travel may also be defined. A suitable threshold distance may be, for example, 50 pixels.

Figure 3:
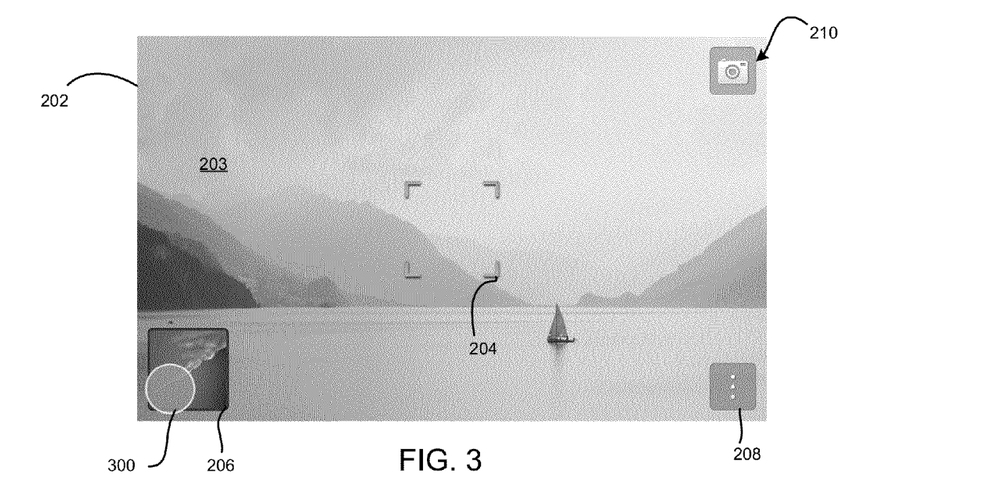

In FIG. 3, a touch event caused by a user touching the touch-sensitive display 118 has been detected by the electronic device 101 in or near the preview portion 206 as indicated by the reference 300. The touch event is shown for illustration only and would not be displayed on the user interface in most if not all instances.

Figure 4:
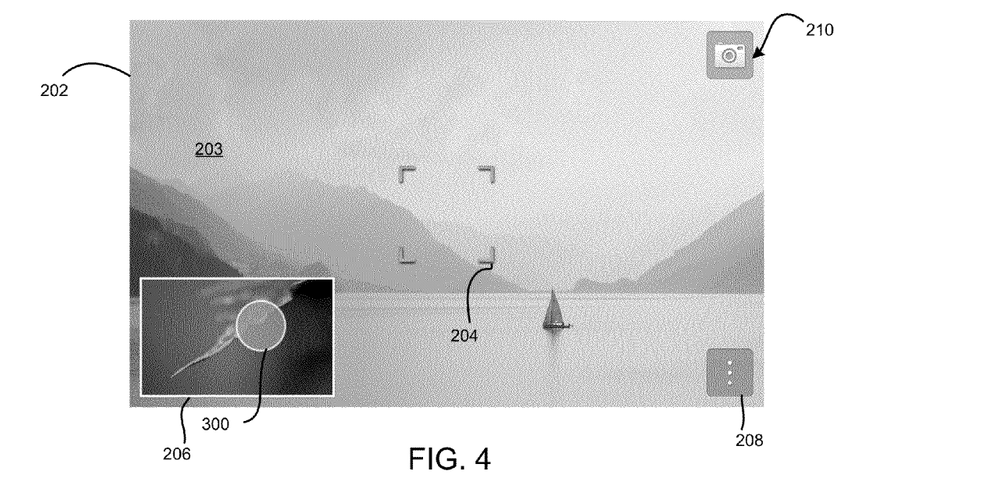
Figure 5:
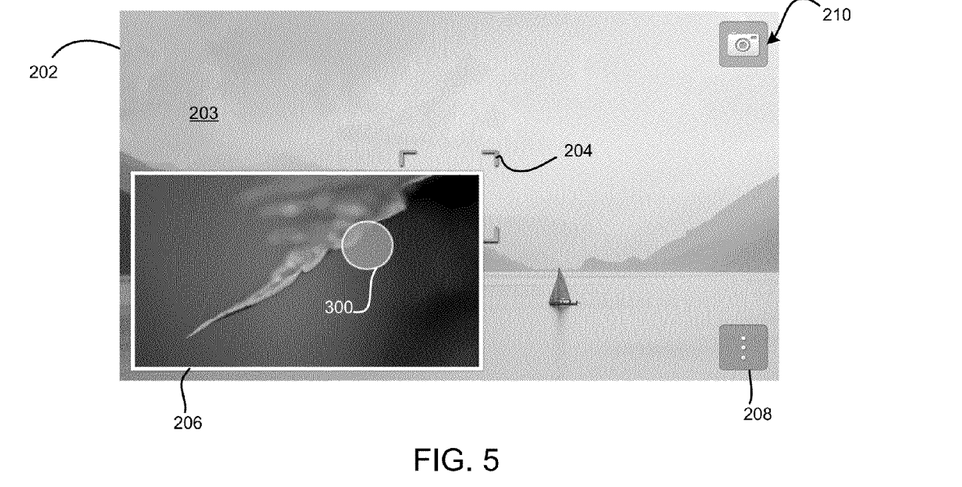
Figure 6:
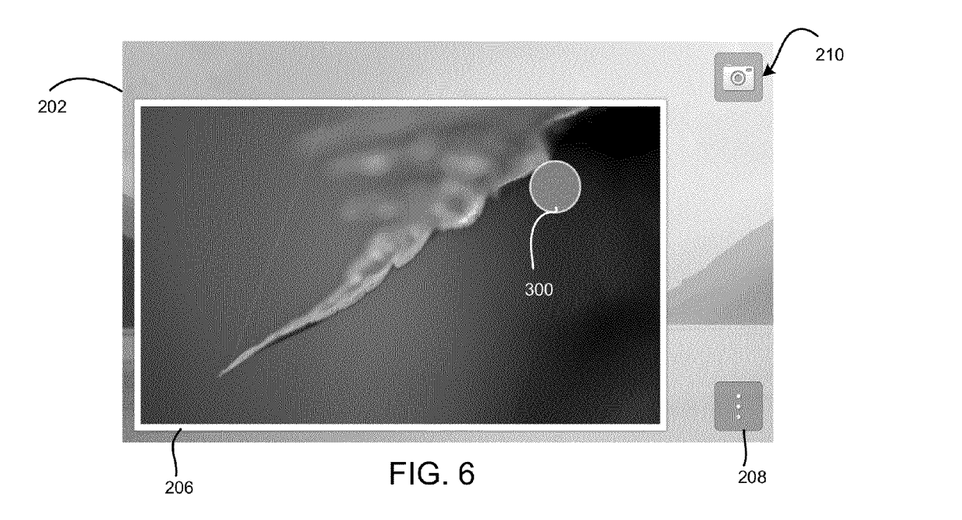

FIGS. 4 to 6 show a progression of movement of the touch event 300 from the start point in FIG. 3 to an end point in FIG. 6 and in which the preview portion 206 is enlarged from the initial size shown in FIGS. 2 and 3 to an enlarged size in FIG. 6. In FIG. 5, the reticule 204 is partially occluded by the preview portion 206 and in FIG. 6 the reticule 204 is completely occluded by the preview portion 206. However, in both FIGS. 5 and 6 a portion of the electronic viewfinder portion 202 remains un-occluded. This permits the user to concurrently assess the real-time image 203 while viewing the enlarged preview portion 206.

The preview portion 206 may be enlarged by a fixed amount or by an amount proportional to the distance of the touch point from the start point. When the preview portion 206 is enlarged by a fixed amount, the preview portion 206 may make a transition from the initial size shown in FIG. 2A directly to the enlarged sized shown, for example, in FIG. 6. Typically, the preview portion 206 would enlarge by a smooth transition (e.g., animated). However, the preview portion 206 could jump from the initial size shown in FIG. 2A to the enlarged size shown in FIG. 6. It will be appreciated, however, that the amount of enlargement may vary even when enlarged by a fixed amount, for example, based on user configurable settings. When the preview portion 206 is enlarged proportionally, the preview portion 206 transitions from the initial size shown in FIG. 2A to an enlarged sized such as that shown in one of FIGS. 4 to 6. The preview portion 206 may be enlarged in set intervals based on the travel distance of the touch point, or may be enlarged progressively, pixel-by-pixel. The enlargement may maintain the aspect ratio of the initial size or may permit the aspect ratio to change based on a vector formed by the moved touch point. Conversely, if the touch point is moved backwards towards the start point, the size of the preview portion 206 may be reduced in accordance with the distance of the moved touch point from the start point. Thus, the preview portion 206 and the image displayed within the preview portion 206 is resized by an amount proportional to a distance between a current location of a touch point of the touch gesture from a start point of the touch gesture.

In at least some embodiments, the amount of enlargement is limited by a set maximum to avoid occluding the entire electronic viewfinder portion 202. In other embodiments, the preview portion 206 can be enlarged until the preview portion 206 occupies the full screen or substantially the full screen, at which point the electronic device 101 changes from the camera mode implemented by the camera application 172 to a photo viewer mode implemented by the camera application 174 (sometimes referred to as the camera roll). Images, such as previously captured images from the digital camera 180 or optionally other images, may be viewed on the display 112 in the photo viewer mode. The last captured image is typically displayed by default when entering the photo viewer mode. Other images may be viewed in response to corresponding selection input. For example, in at least some embodiments, a preceding image is selected and displayed in response to a left swipe (if a preceding image exists) and a succeeding image is selected and displayed in response to detection of a right swipe (if a succeeding image exists). The other images may be stored locally or remotely as described above without changing user interface screens.

In some embodiments, tapping the preview portion 206, for example from the user interface screen of any one of FIGS. 2 to 6, causes the electronic device 101 to change from the camera mode implemented by the camera application 172 to the photo viewer mode implemented by the camera application 174.

In other embodiments, the designated enlargement input which can cause the image displayed in the preview portion 206 to be enlarged from the initial size to the enlarged size is a tap in or near the preview portion 206. Other designated enlargement input may be used in yet other embodiments.

The reticule 204, preview portion 206, menu button 208 and mode button 210 may be implemented individually or collectively (in whole or in part) as a layer which overlays the real-time image 203 (known as an overlay) for efficiency of graphics processing.

Figure 7:
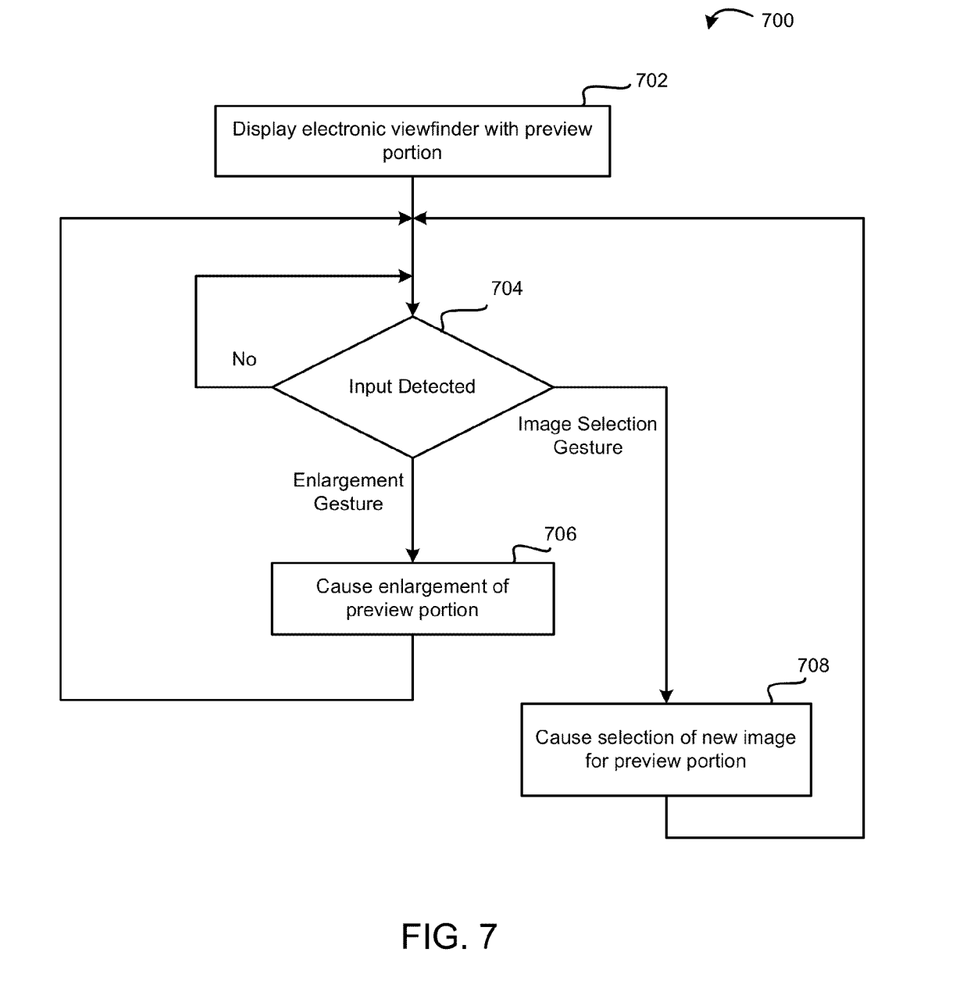
FIG. 7 is a flowchart of a method for displaying an electronic viewfinder and other image data in accordance with one example embodiment of the present disclosure.

FIG. 7 is a flowchart of a method 700 for displaying an electronic viewfinder and other image data in accordance with one example embodiment of the present disclosure. The method 700 may be carried out, at least in part, by software such as the camera application 172, executed by the processor 102. Coding of software for carrying out such a method 700 is within the scope of a person of ordinary skill in the art provided the present disclosure. The method 700 may contain additional or fewer processes than shown and/or described, and may be performed in a different order. Computer-readable code executable by at least one processor 102 of the electronic device 101 to perform the method 700 may be stored in a computer-readable medium such as the persistent memory 144.

A user interface for the digital camera 180 provided by the camera application 172 is displayed on the touch-sensitive display 118 (702), for example, in response to received input. The received input may be depression of a control button or key which is designated for causing the electronic device 101 to enter a camera mode. The user interface is the same or similar to the user interface described above in connection with FIGS. 2 to 6. The user interface may also include a frame or border which surrounds and frames the perimeter of the content area. The user interface screen may be displayed in a frame or window in the GUI or in a full screen format in which the user interface occupies the entire display area.

The electronic device 101 detects various inputs received via the input devices such as the touch-sensitive display 118 (704). Detection may occur passively in response to interrupts from the various input devices, or may occur actively in response to monitoring and analysing output from the various input devices depending on the type and nature of the input device. The electronic device 101 identifies touch gestures based on predetermined touch gesture criteria, such as predetermined touch gesture patterns, recognized by the electronic device 101.

The preview portion 206 is enlarged from an initial size to an enlarged size (706) when designated enlargement gesture (or other designated enlargement input) is detected. The amount of enlargement may be proportional to a distance of travel of the touch gesture, potential up to a set maximum to avoid occluding the entire electronic viewfinder portion 202. As described above, the designated enlargement input is a drag and hold gesture in at least some embodiments. In some of the embodiments, the preview portion 206 returns to the initial size (e.g., a default size) from the enlarged size when the drag and hold gesture ends (e.g., when the user releases or lifts his/her finger from the touch-sensitive display 118). In other embodiments, the preview portion 206 and the image displayed within the preview portion 206 may be maintained at the enlarged size. Further input may return the preview portion 206 and the image displayed within the preview portion 206 to the initial size or other reduced size.

A new image for the preview portion 206 is selected and displayed within the preview portion 206 when a designated image selection gesture for selecting of a new image for the preview portion 206 is detected (708). This allows a user to preview images other than the last captured image (e.g., one or more images previously captured with the digital camera 180 or potentially other images). The other images may be stored locally or remotely as described above without changing user interface screens. Instead, the user can swipe to preview a different image. This step is optional and may not be performed in all embodiments. The selecting of the new image may be based on a direction of the touch gesture.

In some embodiments, the image selection gesture is performed outside of the preview portion 206 or at least has a start point outside of the preview portion 206 to simplify the differentiation between the enlargement gesture and image selection gesture for the electronic device 101 and the device user.

In some embodiments, a preceding image is selected in response to a left swipe (if a preceding image exists) and a succeeding image is selected in response to detection of a right swipe (if a succeeding image exists). A preceding image is an image which precedes the currently previewed in order, typically chronological order of the date and time the image was captured (or stored if image capture date is not available or applicable) but possibly alphabetical order based on file name or other suitable ordering of the images. A succeeding image is an image which succeeds the currently previewed in order, typically chronological order of the date and time the image was captured (or stored if image capture date is not available or applicable) but possibly alphabetical order based on file name or other suitable ordering of the images. The selecting may be proportional to the travel distance of the touch gesture. For example, the electronic device 101 may select an image n position from a position of currently displayed image in the image order, where n=travel distance (pixels)/set interval length (pixels) per position.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method for displaying a camera user interface on a touch-sensitive display of an electronic device having a digital image sensor for capturing images, the method comprising:
    displaying the camera user interface on the touch-sensitive display when the electronic device is in a camera mode, the camera user interface including a preview portion and a viewfinder portion, the preview portion for displaying a previously captured image, the viewfinder portion for displaying a real-time image captured by the digital image sensor, the viewfinder portion and the preview portion being concurrently maintained on the touch-sensitive display while the electronic device is in the camera mode, the preview portion having a default size and location;
    in response to detecting a drag and hold gesture originating with a touch within the preview portion and extending towards the viewfinder portion, expanding the preview portion within the camera user interface from the default size and the default location; and
    following detection of the drag and hold gesture originating with the touch within the review portion, in response to detecting an absence of a touch on the touch-sensitive display, decreasing the preview portion within the camera user interface to the default size and the default location.

2. The method of claim 1, wherein the expanding and decreasing of the preview portion occurs in the absence of visual affordance regarding resizing of the previously captured image.

3. The method of claim 1, wherein the expanding and decreasing of the preview portion occurs in the absence of a visual cue for the drag and hold gesture.

4. The method of claim 1, wherein the previously captured image is a last captured image.

5. The method of claim 1, wherein the default location of the preview portion is towards a bottom left corner of the viewfinder portion.

6. The method of claim 1, further comprising:
    selecting and displaying a new image in response to detecting an image selection gesture having a start point outside of the preview portion, wherein a preceding image is selected and displayed in response to detecting the image selection gesture being in a first direction and a succeeding image is selected and displayed in response to detecting the image selection gesture being in a second direction.

7. The method of claim 1, wherein the drag and hold gesture comprises a swipe.

8. The method of claim 1, further comprising:
    changing from the camera mode to a photo viewer mode for viewing previously captured images in response to the preview portion being enlarged to a full screen size, wherein the changing comprises changing the displayed user interface on the touch-sensitive display from the camera user interface to a photo viewer user interface screen.

9. The method of claim 1, further comprising:
    changing from the camera mode to a photo viewer mode for viewing previously captured images in response to detecting a tap event in the preview portion, wherein the changing comprises changing the displayed user interface on the touch-sensitive display from the camera user interface to a photo viewer user interface screen.

10. The method of claim 8, wherein the previously captured image is initially displayed within the photo viewer user interface screen.

11. The method of claim 8, further comprising:
    within the photo viewer user interface screen, selecting and displaying a preceding image within the photo viewer user interface screen in response to detecting an image selection gesture in a first direction; and
    within the photo viewer user interface screen, selecting and displaying a succeeding image within the photo viewer user interface screen in response to detecting an image selection gesture in a second direction.

12. The method of claim 11, wherein the image selection gesture in a first direction is a left swipe and the image selection gesture in a second direction is a right swipe.

13. The method of claim 1, further comprising:
    cropping the previously captured image from an original aspect ratio to a cropped aspect ratio which matches an aspect ratio of the preview portion at a default size when the original aspect ratio is different than the aspect ratio of the preview portion,
    wherein the previously captured image is displayed in the cropped aspect ratio when the preview portion is at a default size.

14. The method of claim 13, wherein the previously captured image changes from a cropped image in the cropped aspect ratio to a full size image in the original aspect ratio in response to designated enlargement input.

15. A portable electronic device, comprising:
    a processor;
    a touch-sensitive display coupled to the processor; and
    a digital image sensor coupled to the processor,
    wherein the processor is configured to:
    display a camera user interface on the touch-sensitive display when the electronic device is in a camera mode, the camera user interface including a preview portion and a viewfinder portion, the preview portion configured to display a previously captured image, the viewfinder portion for displaying a real-time image captured by the digital image sensor, the viewfinder portion and the preview portion being concurrently maintained on the touch-sensitive display while the electronic device is in the camera mode, the preview portion having a default size and location;

in response to detecting a drag and hold gesture originating with a touch within the preview portion and extending towards the viewfinder portion, expand the preview portion within the camera user interface from the default size and the default location; and following detection of the drag and hold gesture originating with the touch within the preview portion, in response to detecting an absence of a touch on the touch-sensitive display, decrease the preview portion within the camera user interface to the default size and the default location.

16. The electronic device of claim 15, wherein the processor is further configured to expand and decrease the preview portion in the absence of visual affordance regarding resizing of the previously captured image.

17. The electronic device of claim 15, wherein the processor is further configured to expand and decrease the preview portion in the absence of a visual cue for the drag and hold gesture.

18. The electronic device of claim 15, wherein the processor is further configured to change from the camera mode to a photo viewer mode for viewing previously captured images in response to the preview portion being enlarged to a full screen size, wherein the changing comprises changing the displayed user interface on the touch-sensitive display from the camera user interface to a photo viewer user interface screen.

19. The electronic device of claim 15, wherein the processor is further configured to change from the camera mode to a photo viewer mode for viewing previously captured images in response to detecting a tap event in the preview portion, wherein the changing comprises changing the displayed user interface on the touch-sensitive display from the camera user interface to a photo viewer user interface screen.

20. The electronic device of claim 18, wherein the previously captured image is initially displayed within the photo viewer user interface screen.

21. A graphical user interface for a camera mode displayed on a touch-sensitive display of an electronic device in the camera mode, the electronic device having a digital image sensor for capturing images, the graphical user interface comprising:

a preview portion configured to display a previously captured image, the preview portion having a default size and location; and a viewfinder portion for displaying a real-time image captured by the digital image sensor, the viewfinder portion and the preview portion being concurrently maintained on the touch-sensitive display while the electronic device is in the camera mode;

wherein in response to detecting a drag and hold gesture originating with a touch within the preview portion and extending towards the viewfinder portion, expanding the preview portion within the camera user interface from the default size and the default location; and wherein following detection of the drag and hold gesture originating with the touch within the preview portion, in response to detecting an absence of a touch on the touch-sensitive display, decreasing the preview portion within the camera user interface to the default size and the default location.

22. The method of claim 1, wherein the viewfinder portion occupies all of the touch-sensitive display and the preview portion is configured to display a single previously captured image.

23. The method of claim 1, wherein the preview portion is expanded and decreased within the camera user interface while currently maintaining the viewfinder portion on the remainder of the touch-sensitive display.

24. The method of claim 1, wherein expanding the preview portion within the camera user interface includes decreasing the viewfinder portion and wherein decreasing the preview portion within the camera user interface includes expanding the viewfinder portion.

* * * * *

UNITED STATES PATENT AND TRADEMARK OFFICE
CERTIFICATE OF CORRECTION

PATENT NO.        : 8,675,113 B2                                          Page 1 of 1
APPLICATION NO.   : 13/405040
DATED             : March 18, 2014
INVENTOR(S)       : Rydenhag et al.

It is certified that error appears in the above-identified patent and that said Letters Patent is hereby corrected as shown below:

On the title page, Item (73), change "(73) Research In Motion Limited, Waterloo, Ontario (CA)" to --Blackberry Limited, Waterloo, Ontario (CA)--.

Signed and Sealed this
Thirteenth Day of October, 2015

Michelle K. Lee
*Director of the United States Patent and Trademark Office*